United States Patent [19]

Olander

[11] 4,054,553

[45] * Oct. 18, 1977

[54] POLYPHENYLENE OXIDE PROCESS

[75] Inventor: Walter K. Olander, Saratoga, N.Y.

[73] Assignee: General Electric Company, Schenectady, N.Y.

[*] Notice: The portion of the term of this patent subsequent to May 11, 1993, has been disclaimed.

[21] Appl. No.: 582,910

[22] Filed: June 2, 1975

[51] Int. Cl.$^2$ .............................................. C08G 65/44
[52] U.S. Cl. .............................. 260/47 ET; 260/874; 260/876 R
[58] Field of Search .................. 260/47 ET, 876, 874

[56] References Cited

U.S. PATENT DOCUMENTS

| | | | |
|---|---|---|---|
| 3,306,875 | 2/1967 | Hay | 260/47 |
| 3,383,435 | 5/1968 | Cizek | 260/874 |
| 3,444,133 | 5/1879 | Behr et al. | 260/47 ET |
| 3,825,521 | 7/1974 | Izawa et al. | 260/47 ET |

OTHER PUBLICATIONS

Shono et al., Makromol. Chem. 105, 277–279 (1967).

*Primary Examiner*—Carman J. Seccuro
*Attorney, Agent, or Firm*—F. Wesley Turner; Joseph T. Cohen; Jerome C. Squillaro

[57] ABSTRACT

A process of forming self-condensation products of a phenol under polymer-forming reaction conditions which comprises contacting a phenol with oxygen in the presence of a secondary aliphatic amine and an effective manganese chelate complex is described. The resulting polyphenylene oxide resins in combination with styrene resins provide thermoplastic compositions having improved impact strength.

5 Claims, No Drawings

POLYPHENYLENE OXIDE PROCESS

This invention relates to a process of forming self-condensation products of a phenol under polymer-forming reaction conditions which comprises contacting a phenol with oxygen in the presence of a secondary aliphatic amine and an effective manganese chelate complex.

In my copending U.S. Ser. Nos. 491,370 (now U.S. Pat. No. 3,956,242, issued May 11, 1976),491,475 field jointly on July 24, 1974; and 534,903 (now U.S. Pat. No. 3,965,069, issued June 22, 1976) filed Dec. 20, 1974, I describe polyphenylene oxide processes which employ manganese chelates as catalysts in the oxidative coupling of phenols to form polyphenylene oxide (also commonly referred to as polyphenylene ethers). As disclosed in my above-referred application, although the use of specific amines has been taught by Hay's in U.S. 3,306,874, 3,306,875, etc., as essential to the oxidative coupling of phenols to polyphenylene oxide using a copper amine catalyst in the presence of oxygen, I have taught that it is unessential in the practice of the processes described in my copending applications that any amine be employed in combination with manganese chelate catalysts in the preparation of polyphenylene oxide.

Unexpectedly, I have now found that even though my polyphenylene oxides have property profiles, e.g. molecular weights, intrinsic viscosities, uv and ir spectra, essentially identical to Hay's polyphenylene oxides, that when my polyphenylene oxides are blended with styrene resins, that the resulting polyphenylene oxide-styrene resin blends do not have impact strength property profiles associated with Hay's polyphenylene oxide-styrene resin combinations.

In essence, my invention comprises the oxidative coupling of a phenol under polymer-forming reaction conditions to produce a polyphenylene oxide wherein the process is carried out in the presence of a secondary aliphatic amine and an effective manganese chelate complex. The resulting polyphenylene oxide in combination with polystyrene provides resin blends having improved impact strength properties.

In my invention, polyphenylene oxide is formed by passing an oxygen-containing gas through a solution of a phenol in the presence of a secondary aliphatic amine and an effective manganese chelate complex under polymer-forming reaction conditions. In general, presently preferred polymer forming reaction conditions relative to the use of effective manganese complexes are described in my copending applications which are hereby expressly incorporated herein by reference in their entirety. Any phenol known to those skilled in the art, such as those disclosed both in my copending and Hay's U.S. patents referenced above, can be oxidatively coupled to form polyphenylene oxides in my process.

Summarily, my process comprises reacting oxygen with a phenol having the structural formula:

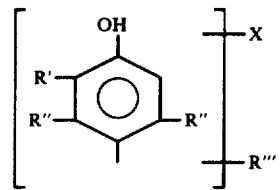
(1)

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R" and R'" being the same as R' and, in addition, halogen, wherein the reacting is carried out in a basic solution in the presence of both a secondary aliphatic amine and an effective manganese chelate complex.

Representative of phenols of Formula 1 which can be employed — either alone or in admixture — are the following: 2,6-dimethylphenol, 2,6-diethylphenol, the 2,6-dibutylphenols, 2,6-dilaurylphenol, the 2,6-dipropylphenols, 2,6-diphenylphenol, 2,6-dimethoxyphenol, 2,3,6-dimethylphenol, 2,3,5,6-tetramethylphenol, 2,6-diethoxyphenol, 2-methoxy-6-ethoxyphenol, 2-ethyl-4-stearyloxyphenol, the 2,6-di-(chlorophenoxy)phenols, 2,6-dimethyl-3-chlorophenol, 2,3-dimethyl-4-chlorophenol, 2,6-dimethyl-3-chloro-5-bromophenol, 2,6-di-(chloroethyl)phenol, 2-methyl-6-isobutylphenol, 2-methyl-6-phenylphenol, 2,6-dibenzylphenol, 2,6-ditolylphenol, 2,6-di-(chloropropyl)phenol, 3,6-di-(2'4'-di-chlorophenyl)-3-allylphenol, etc. Other specific examples of other phenols of Formula 1 are described in Hay's U.S. Pat. No. 3,306,875 and are hereby incorporated herein in their entirety by reference. As expecially presently preferred phenol in the practice of this invention is 2,6-dimethylphenol (also known as 2,6-xylenol) because of its extended use in current polyphenylene oxide production.

Any secondary aliphatic amine can be employed including mono or polyamines, linear or cyclic amines, symmetrical or unsymmetrical amines, branched, or straight-chained amines, etc., subject to the proviso that the amine does not significantly reduce the rate of self-condensation of phenol during the formation of polyphenylene oxide.

Generally useful secondary aliphatic amines have the formula $$HNR^1R^2 \qquad (2)$$

where independently each $R^1$ and $R^2$, singly or in combination, is selected from acyclic and cyclic organic radicals, e.g. alkyl, cycloalkyl, arylallyl, arylcycloallyl, cycloalkylallyl, etc., or mixtures thereof, preferably saturated hydrocarbon radicals. Generally, preferred secondary aliphatic amines are of formula 2 where independently each $R^1$ and $R^2$ has from 1 to 30, more preferably 1 to 20, and even more preferably 1 to 10 carbon atoms. Secondary aliphatic amines where independently each $R^1$ and $R^2$ is selected from $C_{1-8}$, preferably $C_{2-6}$ and even more preferably from $C_{3-5}$ alkyl radicals are presently preferred because of their ready availability from commercial sources.

Illustrative of the broad class of secondary amines that can be employed are the following: dimethylamine, diethylamine, the dipropylamines, e.g. di-n-propylamine, di-sec-propylamine, the di-butylamines, e.g. di-n-butylamine, di-sec-butylamine, di-tert-butylamine, the dipentylamines, the dihexylamines, the diheptylamines, the dioctylamines, the dinonylamines, the didecylamines, the dieicosylamines, the ditriacontylamines, methylethylamine, the methylbutylamines, the ethylchlordecylamines, etc., methylcyclohexylamine, the heptylcyclohexylamines, the octadecylcyclohexylamines, etc., methylbenzylamine, cyclohexylbenzylamine, dibenzylamine, 1-methylamino-2-phenylpropane, allylethylamine, etc.

Generally useful secondary aliphatic polyamines have the formula

$$R^5 + NR^3R^4)_y \qquad (3)$$

where at least one of $R^3$ is hydrogen, independently any other $R^3$ is hydrogen or the same as $R^4$, when $R^3$ is other than hydrogen, independently $R^3$ and $R^4$, singly or in combination, are the same as $R^1$ and $R^2$, $R^5$ is an acyclic or cyclic polyvalent organic radical, preferably a saturated divalent hydrocarbon radical, e.g. alkylene, cycloalkylene, aralkylene, arylcycloalkylene, cycloalkylalkylene, etc., or mixtures thereof, y is a positive integer equal to at least 2 subject to the proviso that at least four carbon atoms separate any nucleophilic sepcies. As used herein and in the appended claims, the term "nucleophilic species" includes any electron-releasing group selected from the group consisting of secondary amino, —NHR$^4$; tertiaryamine, —NR$^3$R$^4$; hydroxy, —OH; alkoxy, —OR$^4$; or alkanoate, —OOCR$^4$ group; where $R^3$ is other than hydrogen, and $R^3$ and $R^4$ are as previously defined. In generally preferred secondary aliphatic polyamines of formula 3, independently each $R^3$ and $R^4$ is selected from $C_{1-8}$, more preferably $C_{2-6}$ and even more preferably from $C_{3-5}$ alkyl radicals, and $R^5$ is selected from $C_{1-8}$, more preferably $C_{2-6}$, and even more preferably from $C_{3-5}$ alkylene radicals. Further, illustrative of the broad class of secondary diamines that can be employed are the following polyamines: N-, N,N'-, N,N,N'- (mono-, di-, and tri-alkyl) butanediamines, N-methyl-1,4-butanediamine, N-methyl, N'-ethyl-1,4-butanediamine, N,N'-diethyl-1,4-butanediamine, N,N,N'-trimethyl-1,4-butanediamine, the N-, N,N'-, N,N,N'-(mono-, di-, and trialkyl) pentanediamines, e.g. N-methyl-1,4-isopentanediamine, N-methyl, N'-ethyl-1,5-pentanediamine, N,N'-dipropyl-1,4-isopentanediamine, N,N,N'-tributyl-1,5-pentanediamine, etc., the N-, N,N'-, N,N,N'-alkylhexanediamines, e.g. N-methyl-1,6-hexanediamine, N,N-diethyl-1,5-hexanediamine, etc., the N-, N,N'-, N,N,N'-alkyl octanediamines, the N-, N,N'-, N,N,N'-alkyl nonanediamines, the N-, N,N'-, N,N,N'-alkyl decanediamines, etc. It is to be understood that the above polyamines examples are but a few of the broad class of the N-, N,N'-, N,N,N'-C$_{1-30}$alkyl (same or different) C$_{4-30}$ alkane diamines that can be employed in the invention.

In addition to the above-described secondary amines, still further examples of other generally useful secondary aliphatic amines include amines where one or more of the hydrogen atoms on the carbon forming the aliphatic chain are substituted by a nucleophile — other than a dialkylamino —NR$^1$R$^2$) nucleophile — such as, hydroxy, —OH; alkoxy, —OR$^1$; or alkanote, —OOCR$^1$; $R^1$ in all instances being defined hereinbefore, subject to the proviso that at least four carbon atoms separate any amino —NR$^1$R$^2$ group from any other nucleophile.

Any effect of manganese chelate complex, including the manganese chelate catalyst system described in my U.S. Ser. Nos. 491,475, 491,370 (now U.S. Pat. No. 3,956,242, issued May 11, 1976) and 534,903 (now U.S. Pat. No. 3,956,242, issued May 11, 1976) — whose descriptions are hereby incorporated in this application by reference — can be employed in our invention.

Illustrative of preferred manganese chelate complexes that can be employed which are described in Ser. Nos. 491,475 and 491,370 (now U.S. Pat. No. 3,965,069, issued June 22, 1976) are the following compounds: Mn(II) bis(benzoinoxime), Mn(II) bis(anisoinoxime), Mn(II) bis(paradimethylaminobenzoinoxime), Mn(II) bis(furoinoxime), Mn(II) bis(acetoinoxime), Mn(II) bis(-methylhydroxybutanoneoxime), Mn(II) bis(α-hydroxyacetophenoneoxime), Mn(II) bis(2-methyl-2-hydroxy-4-pentanoneoxime), Mn(II) bis(phenylhydroxybutaneonoxime), Mn(II) bis(salicylaldoxime), Mn(II) bis(2-hydroxy-5-chlorophenylaldoxime), Mn(II) bis(2-hydroxy-5-bromophenylaldoxime), Mn(II) bis(5-methylsalicylaldoxime), Mn(II) bis(2-hydroxy-5-methylacetophenoneoxime), etc., including combinations thereof. Both in the specification and in the appended claims, the complexes which are members of the classes set out in Ser. Nos. 491,475 and 491,370 (now U.S. Pat. No. 3,956,242, issued May 11, 1976) are described herein as Type A complexes, i.e., complexes which promote the formation of polyphenylene oxide having an intrinsic viscosity, [η], greater than 0.30 dl./g. at 25° C. measured in chloroform under standard reaction conditions. Standard reaction conditions are defined herein as the polymerization of 2,6-xylenol carried out under atmospheric pressure and a constant temperature of 25° C. in less than 120 minutes employing toluene and methanol as the solvent system where the weight ratio of 2,6-xylenol:toluene:methanol is 10%, 81% and 9%, respectively (10% monomer solids), the proportions by weight of 2,6-xylenol to sodium hydroxide is 16.39:1, and the mole proportions of 2,6-xylenol to manganese chelate is 100:1. Illustrative of other preferred manganese chelate complexes that can be employed — described in greater detail in Ser. No. 534,903 — are mixtures containing a Type A complex, referred to above, and a Type B complex. Type B complexes include the following compounds: Mn(II) bis(salicylaldehyde)ethylenediimine, Mn(II) bis(dimethylglyoxime), Mn(II) bis(diphenylglyoxime), Mn(II) bis(2-aminoethanol), Mn(II) bis(2-oxime-3-butanone), Mn(II) bis(α-aminobutyrate), Mn(II) bis(8-hydroxyquinoline), Mn(II) bis(o-benzenedithiol), Mn(II) bis(2-mercaptoethylamine), Mn(II) bis(pyridine-2-aldazine (N,N,N), Mn(II) bis(salicylideneamino-o-hydroxybenzene), Mn(II) bis(1,6-bis(α-pyridyl)-2,4-diazahexane (N,N,N,N), Mn(II) bis(N,N'-ethylene-bis-2-(o-hydroxyphenyl)glycine), etc.

Both in the specification and in the appended claims, complexes which are members of the Type B manganese chelate compound class set out in Ser. No. 534,903 are described herein as Type B complexes, i.e. complexes which promote the formation of polyphenylene oxide having an intrinsic viscosity [η] equal to or less than 0.30 dl./g. at 25° C. measured in chloroform under standard reaction conditions as defined hereinbefore.

As stated hereinbefore, this invention comprises the reaction of oxygen with a phenol carried out in the presence of a basic solution in which the phenol, secondary aliphatic amine and manganese chelate complex are soluble. The reaction can be carried out in any liquid solvent, e.g. alcohols, ketones, hydrocarbons, chlorohydrocarbons, nitroaromatic hydrocarbons, ethers, sulfoxides, etc. Since the process solvent does not have to act as a solvent for the polymer, it may be desirable to use solvents, e.g. toluene, xylene, chlorobenzene or nitrobenzene or mixtures thereof in combination with methanol in order to precipitate higher molecular weight polymer from the reaction medium during further polymerization of lower molecular weight polymers. Any proportion of phenol to solvent can be employed. However, generally preferred reaction parameters comprise mole proportions of phenol:solvent of from about 30:70 or even higher to about 5:95 or even lower. Presently preferred proportions are from about 25:75 to about 10:90.

The reaction is carried out in a basic reaction medium, e.g., that provided by the presence of a strong alkali metal base, i.e. alkali metal hydroxides, alkali metal alkoxides, or mixtures, etc. Commercial alkali metal base is presently preferred, e.g. sodium hydroxide, potassium hydroxide, lithium hydroxide, sodium methoxide, etc. More preferably anhydrous sodium hydroxide is employed, however, for convenience, aqueous solutions, e.g. 50 percent sodium hydroxide, are generally employed. In general, any phenol: alkali metal base mole ratio can be employed, including ratios of from 1:1 to 100:1, preferably 40:1 to 5:1, and more preferably 20:1 to 10:1. In the preparation of polyphenylene oxide from 2,6-xylenol, generally preferred 2,6-xylenol-alkali metal hydroxide mole ratios are within the range of from about 14:1 to about 18:1.

In general, the mole proportions of phenol-manganese chelate complex can vary widely. Subject to variations based on the type of ligand or ligands associated with manganese, the phenol:manganese chelate complex mole ratio can be as low as about 100:1 to as high as about 3000:1, or 6000:1 under or even as high as about 12,000:1. Preferably, the ratio of phenol:manganese complex is at least 500:1, more preferably at least 1500:1, and even more preferably at least 3000:1.

In general, the reaction temperature can vary widely. Presently preferred reaction temperatures e.g. from about 0° to about 50° C., more preferably from 10° to 40° C., and even more preferably from 20° to 30° C. are employed. In the event that the manganese chelate complex is deactivated at elevated temperatures, e.g. above 50° C., the reaction can be resumed by reducing the temperature and adding thereto additional manganese chelate complex. The process can be carried out at subatmospheric, atmospheric or superatmospheric pressures. When the process is carried out at superatmospheric pressures, pressures greater than 1 to 40 psig, or 1000 psig or even higher can be employed.

In general, any amount of secondary amine can be employed in our process, however, to obtain polyphenylene oxide resins which in combination with styrene resins provide thermoplastic compositions having the desired improved impact strength property profile, the amount of secondary amine employed should be an amount at least sufficient to provide polyphenylene oxide resins which contain from about 250 to about 2000 parts per million by weight of nitrogen, preferably from about 500 to about 1650, and more preferably from about 750 to about 1300 parts per million by weight of nitrogen bound to the skeletal backbone of the polymer. Although not limiting the invention to any theory, it is believed that the impact strength improvement in the polyphenylene oxidestyrene resin blends which employ the polyphenylene oxides of this invention is directly related to the formation of a polyphenylene oxide that contains nitrogen which is chemically bound (bonded) to the polymer backbone. Possible reaction mechanisms whereby nitrogen is chemically integrated into the polymer backbone can be illustrated by equation 4 hereafter which shows the reaction of a secondary amine with a quinone methide or a phenoxy radical.

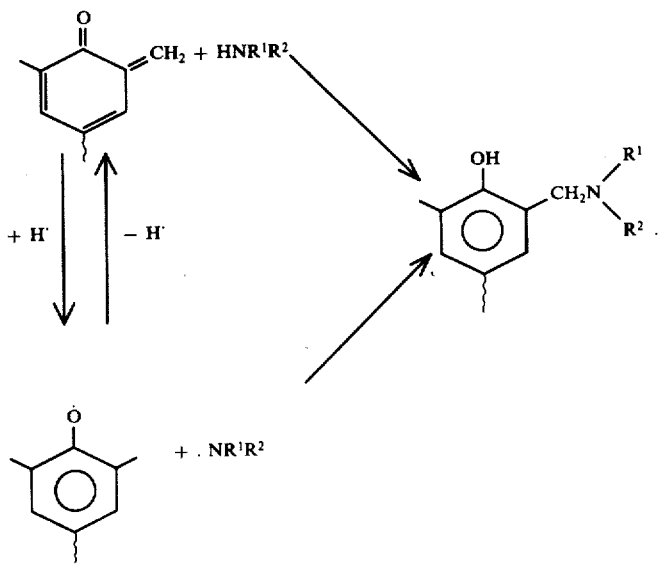

(4)

Any means of adding the secondary amine to the reaction medium during polymerization of the phenol can be employed.

Preferably, however, the amine is added prior to the initiation of the polymerization reaction or is added during a programmed monomer addition sequence during the course of the polymerization reaction, since the early addition of amine to the reaction medium has been found to optimize the improvement in the impact properties of related polyphenylene oxide-styrene resin blends. In addition, the early addition to the reaction media of amine appears to improve the efficiency, i.e. increase the amount of nitrogen directly bonded to the benzylic carbon atoms of the polyphenylene oxide relative to the nitrogen available for bonding from any secondary amino $HNR^1R^2$ source. Any amount of secondary amine can be employed providing that the total nitrogen content of all secondary amine moieties, e.g. $HNR^1R^2$, present during the polymerization reaction, is an amount at least theoretically sufficient — assuming quantitative, i.e. 100%, integration of all nitrogen atoms associated with any $HNR^1R^2$ group into the polymer backbone — to satisfy the stoichiometrically required 250–2,000 parts of nitrogen per million parts of polyphenylene oxide.

The secondary amine nitrogen grams to phenol mole ratio can vary widely, e.g. from 0.035 to 1.000 grams of nitrogen per mole of phenol reactant or even higher. However, unexpectedly, since it has been found that the amount of amine nitrogen incorporated into the polymer backbone decreases as the amount of secondary amine employed in the reaction increases, it is preferred that less than about 0.500, more preferably less than about 0.250 and still more preferably less than about 0.185 grams of nitrogen per mole of phenol be employed.

As stated hereinbefore, the polyphenylene oxides prepared by the process of this invention when combined with a styrene resin having at least (25%) by weight, of polymer units derived from a compound of the formula

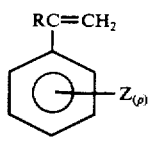

(5)

where R is hydrogen, lower alkyl or halogen; Z is a member selected from the class consisting of vinyl, hydrogen, chlorine and lower alkyl; and p is a whole number equal to from 0 to 5, having improved impact strength. The term "styrene resin" as used throughout this disclosure and in the claims, and as defined by the above formula 5 includes, by way of example, homopolymers such as polystyrene and polychlorostyrene, the modified polystyrenes such as rubber modified polystyrenes, and the styrene containing copolymers, such as the styreneacrylonitrile copolymers, styrenebutadiene copolymers, styrene-acrylonitrile-α-alkyl styrene copolymers, styrene-acrylonitrile-butadiene copolymers, poly-α-methylstyrene, copolymers of ethylvinylbenzene and divinylbenzene, and the like. The preferred styrene resins are the high impact polystyrenes, the styrene-acrylonitrilebutadiene copolymers and styrene-butadiene copolymers.

The method of blending polyphenylene oxide with styrene resin is not critical and does not constitute a part of this invention. The preferred method comprises blending the two polymers in powder or granular form, extruding the blend, and chopping into pellets.

The polyphenylene oxides and the styrene resins are combinable with each other in all proportions. Consequently, compositions comprising from 1 to 99 percent, by weight, polyphenylene oxide and from 99 to 1 percent, by weight, polyphenylene oxide and from 99 to 1 percent, by weight, styrene resin are incuded within the scope of the invention.

In general, preferred resin blends contain from about 30:70 to 70:30, more preferably 40:60 to 60:40, and even more preferably from 45:55 to 55:45 parts by weight of polyphenylene oxide and styrene, respectively. The above preferences are based on the finding that optimum notched Izod Impact Strength (ASTM D256) property profiles for polyphenylene oxide-styrene resin blends (hereafter referred to N.I. resin blend values) are more readily obtained when approximately equal proportions of polyphenylene oxide and styrene resins are blended together.

In general, polyphenylene oxide polymers prepared in the absence of any secondary aliphatic amine — regardless of the amount of polyphenylene oxide combined with the styrene resin of the blends — exhibit N.I. resin blend values equal to or less than about 2.0, often less than 1.0, and even as low as 0.5. Secondary amine modified polyphenylene oxide-styrene resin blends generally exhibit N.I. resin blend values of from about 2.5 to about 5.0, or 7.5 or even higher. Accordingly and comparitively polyphenylene oxide-styrene resin blends — where the polyphenylene oxide is prepared in the presence of a secondary aliphatic amine — generally have N.I. resin blend values of at least 1.5, frequently 2 and even more frequently from 3 to 5 times greater than N.I. resin blend values associated with polyphenylene oxide-styrene resin blends where the polyphenylene oxide of the blend is prepared in the absence of secondary aliphatic amines.

Polyphenylene oxide resins prepared in the absence of secondary aliphatic amines but in the presence of primary or tertiary aliphatic amines generally exhibit N.I. resin blend values of from about 0.5 to about 1.5 and from about 0.5 to 1.0, respectively. However, since N.I. resin blend values below 2.0 limits and often precludes commercial use of blends having such values, the employment of primary or tertiary amines during the preparation of polyphenylene oxide — where primary or tertiary amines are the only available amine nitrogen source — is not included in the scope of this invention.

In general, other than as described above, polyphenylene oxide styrene resin blend properties correspond generally with polyphenylene oxide-styrene resin blend property profiles described by Cizek in U.S. 3,383,435.

The benefits obtained by blending polyphenylene oxides — prepared in accordance with the teachings of this invention — with styrene resin is further illustrated by the following examples.

In all of the examples, the following General Procedure was employed (all parts are by weight unless otherwise stated). For purposes of brevity, only deviations from the General Procedure will be noted in the examples.

General Procedure

A series of polyphenylene oxide-styrene resin compositions were prepared employing (I) secondary amine modified polyphenylene oxides having intrinsic viscosities of at least 0.45 dl./g. at 25° C. as measured in chloroform and (II) commercially available high impact polystyrene resins containing about 10 percent butadiene by weight having a number average molecular weight $M_n$ equal to about 100,000. The polyphenylene oxides and styrene resins were dry blended and precompounded in a hot melt extruder at about 550° F. The extrudate was pelletized, injection molded in an 0.8 oz. Battenfeld molding machine at melt temperatures of 510° F. and mold temperatures of 180° F. to form ASTM D256 notched Izod impact test bars 2½ inches long, ½ inch wide, and ¼ inch thick. The test bars were notched to a depth of 100 mils, and had a notched tip radius of 10 mils. The nitrogen analysis of the polyphenylene oxides was determined by the Kjedahl method (accuracy ± 50 ppm). The polyphenylene oxide nitrogen characterization was determined by $C_{13}$ nmr data.

EXAMPLE I

A series of polyphenylene oxides were prepared (except for control runs empolying no amine) employing various secondary aliphatic amines accordingly: a solution of 2,6-xylenol and toluene was divided into approximately two equal portions, one portion was charged to a reactor and the other portion along with aliphatic amine was charged to a pump reservoir for the purpose of being added at a generally constant rate to the reactor after initiation of the self-condensation reaction of the phenol to polyphenylene oxide. Stoichiometric amounts, sufficient to form a bis-complex of Mn(II) dichloride and benzoin oxime were combined and dissolved in a minimum amount of methanol, and after the Mn(II) chelate-methanol solution was complete, an amount of a phenol-toluene equal to the Mn(II) chelate-methanol was added. A stream of oxygen was introduced into the reactor at ambient temperature at a rate fast enough to provide sufficient oxygen to be in excess over that being absorbed while vigorously stirring the solution. Sufficient manganese chelate catalyst solution was added to the 2,6-xylenol toluene solution to provide a 2,6-xylenol/manganese-(II) mole ratio of 1500:1 and sufficient 50% aqueous sodium hydroxide solution taken up in methanol was added to provide a 16:1 phenol to OH⁻ mole ratio.

After initiation of the polymerization, the reaction was regulated by the rate of addition of the second phenol reactant portion containing the aliphatic amine from the pump reservoir to the reactor. A controllable reaction exotherm was maintained so that the temperature did exceed substantially 45° C., preferably 35° C. When an intrinsic viscosity of at least about 0.45 was obtained, the reaction was stopped by adding sufficient aqueous acetic or sulfuric acid to neutralize the reaction media. After neutralization, the resulting polyphenylene oxide was precipitated with methanol. The polyphenylene oxides were dried at 80°-100° C., and analyzed for nitrogen by Kjedahl method.

The resulting polyphenylene oxides were blended with commercially available high impact polystyrene Foster Grant code SG834 HIPS having the following typical values: tensile 4300 psi (yield), tensile 4200 psi (ultimate), elongation 85%, notched Izod impact strength 2.5 to 3.0 ft.-lbs./in., heat distortion temperature 175° F. at atmospheric pressure, a flexural modulus 300,000 psi, and flexural strength of 55,000 psi. Equal parts of polyphenylene oxide and high impact polystyrene resin, by weight, were employed in the blends.

In Table I, set out hereafter, is a summary of the polyphenylene oxide reaction parameters, the resulting polyphenylene oxide properites and the polyphenylene oxide-styrene resin blend properties.

TABLE I

| Run No. | Secondary Amine | Polyphenylene Oxide Reaction Parameters | | | Polyphenylene Oxide Properties | | | Polyphenylene Oxide/Styrene Resin Blend Properties | |
|---|---|---|---|---|---|---|---|---|---|
| | | Phenol:Amine Mole Ratio | N:phenol (gram: mole ratio) | N(ppm) theory | I.V.[1] | N(ppm) actual | N.I.[3] | E%[4] |
| 1 | dimethyl | 57.7:1 | 0.243 | 2000 | 0.69 | 640 | 2.1 | 44.0 |
| 2 | diethyl | 57.0:1 | 0.247 | 2040 | 0.46 | 950 | 2.9 | n.d. |
| 3 | ethyl n-butyl | 55.3:1 | 0.254 | 2070 | 0.54 | n.d.[2] | 4.6 | n.d. |
| 4 | dibenzyl | 52.9:1 | 0.265 | 2160 | 0.57 | n.d. | 3.0 | 74.6 |
| 5 | di(n-lauryl) | 59.8:1 | 0.234 | 1910 | 0.54 | n.d. | 5.7 | 38.6 |
| 6 | diallyl | 39.7:1 | 0.351 | 2880 | 0.59 | n.d. | 5.8 | 45.1 |
| 7 | di(n-hexyl) | 60.7:1 | 0.213 | 1890 | 0.55 | n.d. | 5.1 | 38.9 |
| 8 | di(n-butyl) | 105.8:1 | 0.132 | 1080 | 0.54 | n.d. | 5.0 | 73.8 |
| 9 | di(n-butyl) | 70.6:1 | 0.199 | 1620 | 0.55 | 935 | 5.2 | 77.8 |
| 10 | di(n-butyl) | 70.5:1 | 0.199 | 1620 | 0.53 | 940 | 5.0 | 81.6 |
| 11 | di(n-butyl) | 70.8:1 | 0.198 | 1620 | 0.60 | 961 | 4.4 | 81.6 |
| 12 | control | none | none | 0 | 0.43 | 10–50 | 1.0 | 56.0 |
| 13 | control | none | none | 0 | 0.75 | 10–50 | 1.5 | 57.0 |
| 14 | control | none | none | 0 | 1.30 | 10–50 | 1.6 | 33.0 |

[1]I.V. = intrinsic viscosity at 25° C. in chloroform.
[2]n.d. = not determined.
[3]N.I. = notched Izod Impact Strength (ft.-lbs./in.)
[4]E = elongation percent.

The above data illustrates that nitrogen bound to the skeletal backbone, e.g. nitrogen directly bonded to the benzylic carbon atoms, of polyphenylene oxide substantially increases the impact resistance of polyphenylene oxide-styrene resin blends when compared with resin blends where no primary, secondary or tertiary aliphatic amine is employed in the preparation of the polyphenylene oxide component.

EXAMPLE II

A series of polyphenylene oxide polymers were prepared in accordance with the General Procedure set out in Example I employing dibutylamine as a secondary aliphatic amine during the polymerization reaction. Varying amounts of the amine were employed.

Set out in Table I hereafter is a summary of the polyphenylene oxide reactor parameters and a correlation of the total (theoretical amount) of secondary amino nitrogen available for integration into the polymer backbone and the amount of nitrogen actually bonded to the polymer.

TABLE I

| | Polyphenylene Oxide Reaction Parameters | | | | Polyphenylene Oxide Properties | |
|---|---|---|---|---|---|---|
| Run No. | Secondary Amine | Phenol:Amine Mole Ratio | N:phenol (grams: mole ratio) | N(ppm) theory | N(ppm) actual | N(%) incorp. |
| 1 | di(n-butyl) | 115.0:1 | 0.122 | 1000 | 850 | 85.0 |
| 2 | di(n-butyl) | 68.7:1 | 0.204 | 1670 | 730 | 43.75 |
| 3 | di(n-butyl) | 34.5:1 | 0.406 | 3330 | 540 | 16.20 |

The substitution of other secondary aliphatic amines, described elsewhere herein, for the secondary aliphatic amines employed in the foregoing examples, analogously results in improved notched Izod impact strenght properties of polyphenylene oxide-styrene resin blends. In addition, primary amines may be present during the preparation of the polyphenylene oxides for the purpose of enhancing the efficacy of the manganese catalyst system in accordance with the teachings of my copending applications if desired.

The polyphenylene oxide resins prepared by the process of this invention are suited because of their excellent physical, mechanical, and chemical properties — in a similar manner to polyphenylene oxide resins prepared by methods well-known to those skilled in the art such as those of Hay's U.S. Pat. No. 3,306,875, etc., — to a wide variety of uses. For example, as pointed out herein, they are especially useful in the preparation of polymer blends with styrene resins which can be molded, calendered or extruded as films, coatings, threads, filaments, tapes and the like. The polymers may also be combined with various fillers, modifying agents, etc., such as dies, pigments, stabilizers, plasticizers, etc.

Other modifications and variations of the present invention are possible in light of the above teachings. It is, therefore, to be understood that changes may be made in the particular embodiments of the invention described which are within the full intended scope of the invention as defined by the appended claims.

I claim:

1. A process of forming self-condensation products of a phenol having the structural formula:

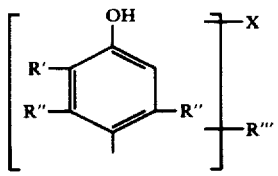

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R" and R'" being the same as R' and, in addition, halogen under reaction conditions which comprise contacting said phenol with oxygen in the presence of a basic reaction medium, a secondary aliphatic amine, and a Type (A) or a mixture of Type (A) and Type (B) manganese chelate complexes selected from Type (A) complexes of the formulas:

$(L^1)_xMn$,            Type (A)

where $L^1$ is a ligand derived from an ortho-hydroxyareneoxime of the general formula

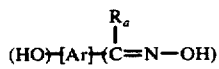

wherein $R_a$ is independently selected from the group consisting of hydrogen and lower alkyl radicals having from 1-5 carbon atoms, Ar is at least a divalent arene radical having at least one —OH radical and at least one

radical attached directly to ortho-positioned arene ring carbon atoms, and an ω-hydroxyoxime of the formula

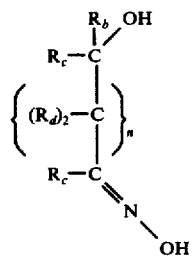

wherein each $R_b$, $R_c$, $R_d$ and $R_e$ is independently selected from the group consisting of hydrogen, acyclic and cyclic organic radicals, and n is a positive integer equal to 0 or 1, Mn is the transition metal manganese, and x is a positive number at least equal to about 0.5, and selected from Type (B) complexes of the formula:

$(L^2)_xMn$,            Type (B)

wherein $L^2$ is a ligand other than an $L^1$ ligand, Mn is the transition metal manganese, and x is a positive number at least equal to about 0.5.

2. The process of claim 1 where the amine is of the formula $HNR^1R^2$, where independently each $R^1$ and $R^2$, singly or in combination, is selected from acyclic and cyclic organic radicals having from 1-30 carbon atoms.

3. The process of claim 1 where the amine is of the formula $R^5$—$(NR^3R^4)$, where at least one of $R^3$ is hydrogen, independently any other $R^3$ is hydrogen or the same as $R^4$, when $R^3$ is other than hydrogen, independently $R^3$ and $R^4$, singly or in combination, are the same as $R^1$ and $R^2$, $R^5$ is an acyclic or cyclic polyvalent organic radical having from 4 to 30 carbon atoms, and y is a positive integer equal to at least 2.

4. The process of claim 1 where the secondary amine nitrogen grams to phenol mole ratio is from 0.035 to 1.000.

5. The process of claim 4, where the ratio is less than about 0.185.

* * * * *